United States Patent
Takidis et al.

(10) Patent No.: US 10,919,232 B2
(45) Date of Patent: Feb. 16, 2021

(54) STRAPPING DEVICE WITH AN ULTRASONIC WELDING DEVICE

(71) Applicant: Signode Industrial Group LLC, Glenview, IL (US)

(72) Inventors: Dimitrios Takidis, Zürich (CH); Hansjörg Hurni, Zürich (CH)

(73) Assignee: Signode Industrial Group LLC, Glenview, IL (US)

( * ) Notice: Subject to any disclaimer, the term of this patent is extended or adjusted under 35 U.S.C. 154(b) by 141 days.

(21) Appl. No.: 16/077,832

(22) PCT Filed: Feb. 21, 2017

(86) PCT No.: PCT/IB2017/000139
§ 371 (c)(1),
(2) Date: Aug. 14, 2018

(87) PCT Pub. No.: WO2017/144967
PCT Pub. Date: Aug. 31, 2017

(65) Prior Publication Data
US 2019/0039325 A1    Feb. 7, 2019

(30) Foreign Application Priority Data

Feb. 22, 2016   (CH) .................................. 231/16

(51) Int. Cl.
*B29C 65/08* (2006.01)
*B29C 65/74* (2006.01)
(Continued)

(52) U.S. Cl.
CPC .......... *B29C 65/081* (2013.01); *B29C 65/085* (2013.01); *B29C 65/7451* (2013.01);
(Continued)

(58) Field of Classification Search
CPC . B29C 65/081; B29C 65/082; B29C 65/7451; B29C 66/4322; B29C 66/4324; B29L 2031/7276
See application file for complete search history.

(56) References Cited

U.S. PATENT DOCUMENTS

| 4,244,773 A * | 1/1981 | Siebeck .............. B29C 65/7451 |
| | | 156/522 |
| 4,313,779 A | 2/1982 | Nix |
| | (Continued) | |

FOREIGN PATENT DOCUMENTS

| CN | 101743115 A | 6/2010 |
| DE | 39 11 634 A1 | 10/1990 |
| | (Continued) | |

OTHER PUBLICATIONS

Machine Translation of First Office Action issued by CNIPA in connection with CN201780011287.X and dated Nov. 26, 2019.
(Continued)

*Primary Examiner* — Scott W Dodds
(74) *Attorney, Agent, or Firm* — Neal, Gerber & Eisenberg LLP (57) ABSTRACT

The invention relates to a strapping device for strapping packaged goods with a strapping band, said strapping device being provided with a connecting device (5) designed as an ultrasonic welding device (9) in order to form a closure. The ultrasonic welding device (9) is provided with a sonotrode device (13) to which ultrasound generated by an ultrasound converter (10) can be transmitted, and the sonotrode device (13) has a contact surface (21, 24) in a provided region which contacts the strapping band. The contact surface is designed to contact a surface of the strapping band, and the sonotrode device (13) is designed to produce ultrasonic vibrations by means of the contact surface. The aim of the invention is to allow a more compact design for such (Continued)

strapping devices. This is achieved in that the contact surface (21, 24) of the sonotrode (11) is aligned at an angle α which deviates from a right angle relative to the provided vibration direction of the sonotrode (11).

17 Claims, 6 Drawing Sheets (51) Int. Cl.
*B29C 65/00* (2006.01)
*B29L 31/00* (2006.01)
*B65B 13/06* (2006.01)

(52) U.S. Cl.
CPC ...... *B29C 66/1122* (2013.01); *B29C 66/4322* (2013.01); *B29C 66/4324* (2013.01); *B29C 66/49* (2013.01); *B29C 66/8167* (2013.01); *B29C 66/81417* (2013.01); *B29C 66/81433* (2013.01); *B29C 66/71* (2013.01); *B29C 66/9513* (2013.01); *B29L 2031/7276* (2013.01); *B65B 13/06* (2013.01)

(56) References Cited

U.S. PATENT DOCUMENTS

| | | | |
|---|---|---|---|
| 4,482,421 A | 11/1984 | Gurak | |
| 5,111,634 A | 5/1992 | Rauch | |
| 5,405,917 A | 4/1995 | Mueller et al. | |
| 5,880,424 A | 3/1999 | Katoh | |
| 6,532,722 B2 | 3/2003 | Gerhart et al. | |
| 6,543,341 B2 | 4/2003 | Lopez | |
| 6,584,892 B2 | 7/2003 | Flaum et al. | |
| 6,911,799 B2 | 6/2005 | Jensen | |
| 6,945,164 B2 | 9/2005 | Kobiella et al. | |
| 7,007,597 B1 | 3/2006 | Thas et al. | |
| 7,549,198 B2 | 6/2009 | Gosis et al. | |
| 7,681,496 B2 | 3/2010 | Takidis et al. | |
| 8,904,925 B2 | 12/2014 | Haberstroh et al. | |
| 2004/0232202 A1* | 11/2004 | Mosca | B29C 66/81435 228/1.1 |
| 2007/0051451 A1* | 3/2007 | Mogadam | B29C 53/48 156/73.1 |

FOREIGN PATENT DOCUMENTS

| | | |
|---|---|---|
| EP | 0 095 784 A2 | 12/1983 |
| EP | 2743059 A1 | 6/2014 |

OTHER PUBLICATIONS

European Patent Office as International Searching Authority, International Search Report (and translation into English), dated Jun. 23, 2017, for PCT/IB2017/000139.

"Second Office Action", Machine Translation issued by CNIPA in connection with Application CN201780011287.X, dated May 18, 2020.

"Third Chinese Office Action", From Corresponding Chinese Patent Application No. 201780011287.X issued by CNIPA, with machine translation, dated Sep. 11, 2020.

\* cited by examiner

Fig. 9

STRAPPING DEVICE WITH AN ULTRASONIC WELDING DEVICE

PRIORITY CLAIM

This patent application is a national stage application of PCT/IB2017/000139, filed on Feb. 21, 2017, which claims priority to and the benefit of Swiss Patent Application No. CH 00231/16, filed on Feb. 22, 2016, the entire contents of which are incorporated herein by reference.

BACKGROUND

The invention relates to a strapping apparatus for strapping packaged articles with a strapping band, said strapping apparatus being provided with a connecting device, which is designed as an ultrasonic welding device, for forming a closure on the strapping band, wherein the ultrasonic welding device is provided with a sonotrode device to which ultrasound generated by an ultrasound generator can be transmitted, and the sonotrode device has a contact surface in a designated contact region with the strapping band, wherein the contact surface is provided for butting against a surface of the strapping band, and the sonotrode device is provided for carrying out ultrasonic vibrations with its contact surface.

Strapping apparatuses of this type are used for strapping packaged articles with a plastics strap. For this purpose, a loop of the particular plastics strap is placed around the packaged article. The plastics strap is generally pulled off here from a supply reel. After the loop is completely placed around the packaged article, the end region of the band overlaps with a section of the band loop. At said two-layered region of the band in the strapping apparatus, the band is then clamped in the strapping apparatus, a band tension is applied to the band loop by means of the tensioning device, and a closure is produced between the two band layers, for example, by friction welding at the loop. In this connection, pressure is applied to the band in the region of two ends of the band loop by a friction shoe moving in an oscillating manner. The pressure and the heat arising because of the movement melt the band, which generally contains plastic, locally for a short time. This results in a permanent connection between the two band layers, which at most can be released again with a great force, between the two band layers. Then, or approximately simultaneously, the loop is severed from the supply reel. The respective packaged article is thereby strapped. This strapping operation can take place both with stationary automatic strapping machines and with portable strapping apparatuses.

In order to produce the connection, use is also already made of ultrasonic welding devices. With the latter, ultrasound with a predetermined frequency and amplitude is generated and is introduced into a two-layered band section by means of a contact surface of the ultrasound sonotrode, the contact surface lying against the band. The contact surface of the ultrasound sonotrode that lies in a level and flat manner against a band surface is oriented here perpendicularly to the longitudinal axis of the sonotrode and to the direction of vibration of the converter, as a result of which the maximum efficiency with regard to transmitting the vibration energy into the strapping band is intended to be achieved. The application of ultrasound leads there to heating and melting of the two band layers lying on each other.

The locally melted band regions of the two band layers flow into each other. Similarly as in the case of friction welding, after cooling the two band layers are connected to each other in an integrally bonded manner and the band loop is thereby permanently closed. The fact that existing welding devices based on ultrasonic energy have a comparatively voluminous design and therefore require a large amount of construction space can be considered disadvantageous. Other components of the strapping apparatus, in particular the closure device, therefore have to give way to the ultrasound sonotrode and to the ultrasound converter and have to be arranged at another point of the strapping apparatus. The construction of strapping apparatuses of this type is thereby complicated.

SUMMARY

The invention is therefore based on the object of permitting a more compact design of strapping apparatuses of the type mentioned at the beginning.

This object is achieved according to the invention in the case of a strapping apparatus of the type mentioned at the beginning in that the contact surface of the sonotrode is oriented at an angle $\alpha$ differing from a right angle with respect to the designated vibration direction of the sonotrode. The object is also achieved by a strapping apparatus as claimed in claim 10 and by a strapping method as claimed in patent claim 12.

It has been shown that, with a measure appearing surprisingly simple at first glance, namely by inclining the longitudinal axis, which arises in the sonotrode from the direction of vibration of the ultrasound generated by the converter of the sonotrode device, with respect to the contact surface, a more compact design can be achieved without the functioning capability of the ultrasound welding device thereby being impaired in a relevant manner. Contrary to expectations, the closure formation process is not impaired by this means although the longitudinal axis of the sonotrode is not oriented here in accordance with the prevailing teaching perpendicularly to the surface against which it bears and into which ultrasound is introduced for producing a closure between the plurality of band layers. Contrary to prevailing assumptions, the achieving of the sought working result, namely the formation of a closure between two strapping band layers arranged one above the other and lying against each other, is not impaired in a functionally relevant manner. On the contrary, as has been shown within the context of the present invention, the process for forming the closure and the admission of energy required for this purpose into the strapping band take place with good working results. It can be presumed that, although because of the inclination according to the invention of the sonotrode a smaller portion of ultrasonic energy in accordance with the size of the angle of inclination is available for producing the connection, this is compensated for where possible by a portion of the ultrasonic vibrations, which portion is oriented substantially parallel to the contact surface, contributing in the manner of a vibration or friction welding operation additionally to the ultrasonic welding operation for heating and for melting the plastic of the strapping band. Provided that these relationships are correct, the portion of the longitudinal ultrasonic vibration that is oriented parallel to the contact surface is not lost for the formation of a closure, but rather, contrary to the prevailing teaching opinion, also make a contribution to the local melting of the surfaces lying against one another of the band layers of the strapping band.

In conjunction with the present invention, it is preferred that the angle $\alpha$ enclosed by the contact surface and a longitudinal axis of the sonotrode is smaller than 90°, but is at least 5°, preferably at least 10° and particularly preferably at least 15°. It is particularly preferred here that the angle α is smaller than or equal to 80°, preferably smaller than or equal to 70°. A particularly suitable specific angle α can be, for example, 30°.

In the region of the action point at which a strapping apparatus acts on the band in conjunction with the tensioning operation, the closure operation and the separating operation, a multiplicity of components are arranged in an extremely narrow space. A comparatively small construction space is available for the components which are to be arranged; there is a lack of space, and the arrangement of components on the same side of the band surface as the sonotrode is associated with complications and technical complexity. With the present invention, it is now possible to arrange the sonotrode device obliquely with respect to the band surfaces such that only the contact surface is located in the region of action and the sonotrode protrudes obliquely from the band surface. In comparison to previously known strapping apparatuses, the closure device can thereby be configured particularly compactly and space can be made available on the side of the region of the point of action of the contact surface of the sonotrode device.

The oblique orientation according to the invention of the contact surface of the sonotrode with respect to its own longitudinal axis can also be provided in an advantageous and particularly preferred manner in that a plurality of contact surfaces, in particular two and only two contact surfaces, can be formed on a sonotrode device. Since contact surfaces of this type of sonotrode devices are subject to wear because of their use during ultrasonic welding, the at least two contact surfaces formed on a sonotrode device make it possible for the service life of a sonotrode device or the sonotrode to be extended by a factor which corresponds to the number of contact surfaces on a sonotrode device. By means of this preferred embodiment according to the invention, the service life of a sonotrode according to the invention can therefore be extended at least by the factor of two and therefore costs for worn sonotrodes can be approximately halved.

It is preferred here that the longitudinal axis of the sonotrode, along which the ultrasonic vibrations which are generated by the ultrasound converter and are preferably in the form of longitudinal waves, does not intersect the center, i.e. the region of a center of the contact surface, which is in the use position, of the sonotrode, as was previously customarily the case. Nevertheless, the present invention also includes embodiments in which the longitudinal axis intersects the surface of the contact surface at a distance from all of the edges of the contact surface at an angle differing from 90°, in particular in a central region of the contact surface. In order to particularly easily realize two contact surfaces on a sonotrode, which can be used one after the other and independently of each other, and to bring them with little outlay correctly into their respective use position, it can be of advantage that the two contact surfaces are not arranged parallel to each other and the longitudinal axis runs between the two contact surfaces either without contact with the two contact surfaces or else the two contact surfaces butt together at a common longitudinal edge which is intersected by the longitudinal axis.

In order to form two contact surfaces on a sonotrode that can be brought one after the other in time into their use position in the strapping apparatus, it can likewise be of advantage if the two contact surfaces are arranged symmetrically at least with respect to their position in respect of the longitudinal axis. It is particularly preferred here for the at least two contact surfaces to at least substantially have the same size and the same geometrical shape. Furthermore, the two contact surfaces can be arranged on different opposite sides of the longitudinal axis and can each be inclined by the angular value α in relation to the longitudinal axis. This results in an at least approximately conical arrangement of the two contact surfaces, wherein the two contact surfaces themselves preferably enclose twice the angle α with each other. Also in this connection, the angle α is intended to be understood as meaning the angle at which a contact surface or each of the contact surfaces is or are arranged in an inclined manner in relation to the longitudinal axis.

The exchanging of one contact surface, which is located in the sonotrode device of the strapping apparatus in a use position, by another contact surface of same sonotrode or sonotrode device, which contact surface is intended to be brought into the use position instead of the first contact surface, can be carried out, in an advantageous embodiment according to the invention, by changing the relative position of the sonotrode and/or the orientation thereof with respect to its previous use position within the strapping apparatus. An embodiment according to the invention is preferred here in which a rotational movement is carried out for this purpose with the sonotrode. A rotational movement about the longitudinal axis of the sonotrode is particularly preferred here. Particularly high positioning accuracy of the sonotrode can be achieved in a simple manner if, starting from an arrangement of the first contact surface in the use position thereof, only the rotational movement of the sonotrode or of the holder thereof is required for transferring the second contact surface into its working position. The size of the rotational movement can correspond here to the size of the offset by which the second contact surface is arranged offset in relation to the first contact surface on the circumference of the sonotrode. In the case of such a sonotrode device, the at least one further contact surface can be fitted into the use position on the sonotrode device with particularly little outlay and particularly rapidly. After the first contact surface has reached its service life, for example because of wear which has occurred, the rapid changing to the second contact surface integrated in the sonotrode can make it possible to reduce non-productive idle times of a strapping apparatus. A further particularly expedient embodiment in which the sonotrode can be arranged only in the rotational positions, which are provided for the contact surfaces, relative to the ultrasonic generator can also contribute thereto. This can be undertaken, for example, by a form-fitting arrangement of the sonotrode on the sonotrode receptacle, which arrangement is intended to be reachable in such embodiments according to the invention only when the sonotrode is arranged in the correct rotational position. In this connection, in a preferred embodiment of the invention, the form-fitting, but re-releasable, arrangement of the sonotrode can be present at least with respect to a longitudinal axis of the sonotrode and upon rotational movements about said longitudinal axis or with respect to a rotationally fixed arrangement of the sonotrode. In the same or in other preferred embodiments of the invention, the sonotrode can be arranged in the axial direction with respect to its longitudinal axis in a force-fitting and movement-fixed manner, so as to be releasable.

In a further expedient embodiment of the invention, the at least one contact surface of the sonotrode can be provided with a curvature. The curvature can advantageously be oriented in such a manner that, in the use position of the contact surface, it runs at least substantially in the direction of the longitudinal direction, or parallel to the intended longitudinal direction, of the band portion of the strapping band. Furthermore, the curvature can advantageously extend over part or over the entire length of the contact surface in the longitudinal direction of the strapping band. Finally, it can also be expedient for a curvature with a constant radius to be provided. The size of the curvature, in particular a radius, is intended to be dimensioned here in such a manner that a penetration depth of a toothing of the contact surface—starting from at least one point of maximum penetration depth—leads in the direction of curvature to a decreasing penetration depth of the toothing, preferably to a continuously decreasing penetration depth. By means of these measures, tension peaks of the band subjected to a tensile load can be reduced, and also—despite the high loading of the band during the formation of the closure—damage to the band can be avoided and homogeneous welding and therefore the formation of reliably loadable closures can be achieved.

For the production of a closure on the strapping band, the sonotrode of the ultrasonic welding device can be transferred from an inoperative position into a closure formation position and, after a closure has been formed, can be transferred back again in the reverse direction into the inoperative position. By this means, the contact surface can be transferred from a greater distance from the counterholder, which said contact surface has in the inoperative position, to a smaller distance from the counterholder in the closure formation position in which the contact surface is provided for contact with the strapping band. At least the transfer movement into the closure formation position, preferably also the resetting movement, can be a motor driven movement. During the transfer movement of the sonotrode, a separating element of a separating device can also be transferred into its separating position in which it is provided for severing the strapping band. The band loop which is already produced is severed here from a band supply. A compact design can advantageously be achieved in that the separating element is at least indirectly arranged on the ultrasound device in such a manner that the separating element is carried along into its separating position during the movement of the ultrasound device. With this embodiment, it is possible with little outlay also to remove the separating device from the direct region of action on the band when the separating device is not in use. At these times, the separating device therefore opens up space in the region of action on the strapping band for other components of the strapping apparatus. This likewise contributes to a compact design of the strapping apparatus and to the preferably provided common driving movement for the ultrasonic welding apparatus and the separating device for the transfer movement thereof toward the strapping band and away therefrom. In other embodiments of the invention, the separating device with its at least one separating element can also be fitted at a different position than on the ultrasound device and can possibly also be moved separately therefrom.

In a further preferred embodiment, in addition to the common transfer movement, the separating device can also carry out a relative movement in relation to the ultrasonic welding device. This movement is preferably used as a separating movement with which a separating element of the separating device severs the band from the band supply. The separating movement can expediently be produced after the separating element has been transferred into its separating position. This has likewise proven favorable if, in order to produce the separating movement, the same transfer path is used by the one common driving motor, with which the transfer movement is also transmitted to the separating device. In a preferred embodiment, a common driving motor and a common control cam of a camshaft drive can be used for this purpose, in particular simultaneously.

Further preferred refinements of the invention emerge from the claims, the description and the drawing.

BRIEF DESCRIPTION OF THE DRAWINGS

The invention is explained in more detail with reference to exemplary embodiments which are illustrated purely schematically in the figures, in which.

DETAILED DESCRIPTION

Figure 1:
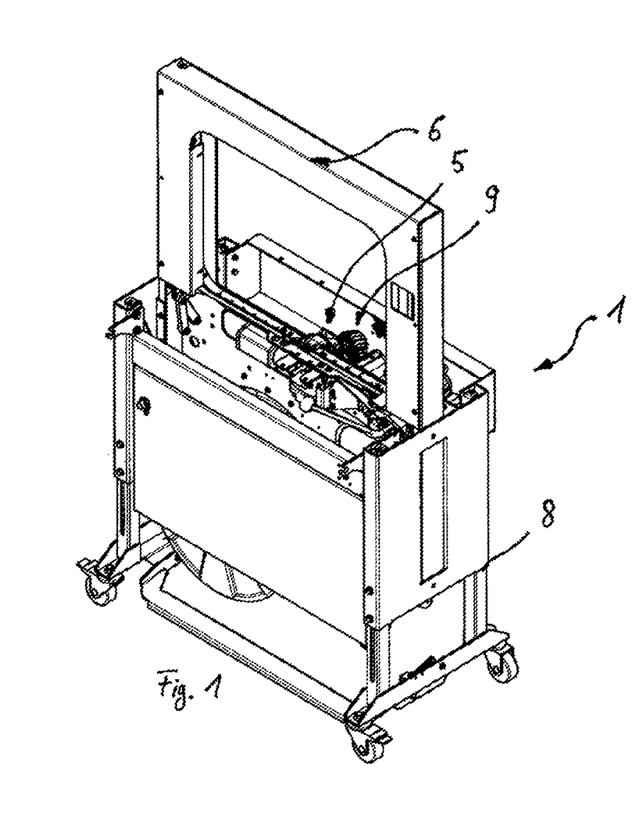
FIG. 1 shows a strapping apparatus according to the invention which is provided with an ultrasonic welding apparatus according to the invention.

FIG. 1 shows a strapping apparatus 1 which is provided with a controller, a supply device 3 for storing and for providing a strapping band, and with a tensioning and closure device 5 (connecting device). Plastics strapping bands which can contain in particular polypropylene (PP) or polyethylene terephthalate (PET) as materials are provided as strapping bands. The tensioning and closure device 5 serves, inter alia, for generating an advancement movement and for generating a retraction movement of the strapping band. In addition, the tensioning device serves for applying a band tension to a band loop, and the closure device for producing a closure on the strapping band. In addition, the strapping apparatus has a band guide 6 with which the band can be placed mechanically and automatically on a predetermined path in the manner of a loop about a packaged article (not shown in the illustration of FIG. 1). For this purpose, the packaged article is arranged on a horizontally oriented table top (likewise not shown in FIG. 1) of the strapping apparatus in a manner such that the band guide surrounds the packaged article. In the exemplary embodiment, a lower horizontally running limb of the band guide 6 runs below the packaged article in the region of the table top. In addition, a welding and clamping unit 16 for the band is integrated in the tensioning and closure device 5 and is used to clamp the band and to produce a closure between two band layers. Except for the differences discussed below regarding previously known tensioning and closure devices, this exemplary embodiment of a tensioning and closure device 5 according to the invention involves components of strapping apparatuses that are known per se.

Figure 2:
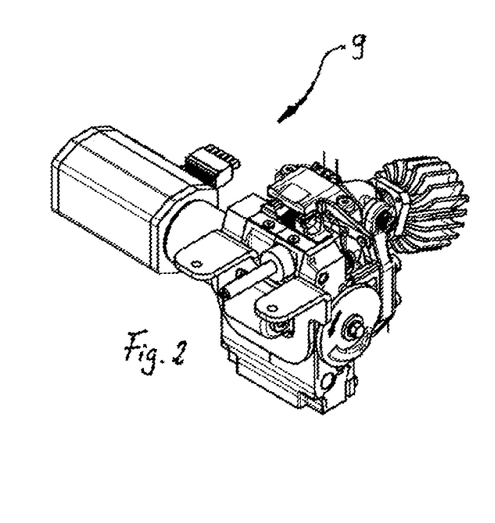
FIG. 2 shows a component of the strapping apparatus from FIG. 1 with the ultrasonic welding apparatus according to the invention.

The tensioning and closure device 5 which is arranged together with the band guide 6 on a framework 8 and is illustrated separately and partially in FIG. 2 has a band driving device which is likewise known per se and is not illustrated specifically in the figures. The latter can be provided in particular with one or more roller pairs and possibly with further individual deflecting rollers. The band is arranged between roller pairs of the rollers and, by drive of at least one roller, is acted upon with an advancement, retraction or tensioning movement. With the advancement movement, the band is pushed at high speed through the band guide 6, which is self-contained, and therefore, at the end of the advancement movement, the band forms a band loop and is arranged in two layers in the region of the band end. After the band end has been clamped by means of a band clamp (again not illustrated), the band of the band loop is retracted by means of rollers of the tensioning and closure device in a direction opposed to the advancement direction. By this means, the band passes out of the channel of the band guide 6 and is placed against the packaged article arranged in the strapping apparatus 1. For this purpose, the channel can be provided, for example, with movable flaps by means of which the band channel can be opened. Subsequently, the attached band is provided with increased band tension by means of a further retraction movement applied by rollers, as a result of which the band lies tautly against the packaged article. Operations of this type are basically known in multiple and various ways from the prior art and are therefore not discussed in more detail.

FIGS. 2 to 10 illustrate the closure device or parts thereof which have an ultrasonic welding device 9 for producing a closure between two band layers of the strapping band. Said ultrasonic welding device is provided with an ultrasound converter 10 which is provided for carrying out vibrations with frequencies in the ultrasound range, namely of 20 kHz to 100 kHz. In particular frequencies from a range of 20 kHz to 40 kHz are preferred here.

In the exemplary embodiment, the ultrasound converter can be particularly preferably operated with a frequency from a range of 32 kHz to 38 kHz, in particular with a frequency of 35 kHz. In conjunction with the present invention, the ultrasound converter 10 can be an ultrasound converter which is known from the prior art and is suitable for producing welded connections on plastics bands, and therefore said ultrasound converter is likewise not discussed below in more detail. The same applies to the electronic device with which the ultrasound converter 10 is operated. A sonotrode device 13 to which the ultrasound converter 10 transmits the vibrations generated by it can be connected to the ultrasound converter 10. Unlike the situation in the exemplary embodiment illustrated, in other exemplary embodiments according to the invention a booster can be provided between the ultrasound converter 10 and the sonotrode 11, with which booster the size of the amplitude of the ultrasonic vibration can be changed, in particular enlarged. A booster is therefore a sound-amplitude transformer for changing the vibration amplitude of the ultrasonic vibration. The ultrasound converter 10 and the sonotrode 11 and also the booster connected inbetween, if present, are customarily substantially arranged one behind another and along a longitudinal axis 12 which corresponds to the vibration direction and/or propagation direction of the ultrasonic vibration.

Figure 3:
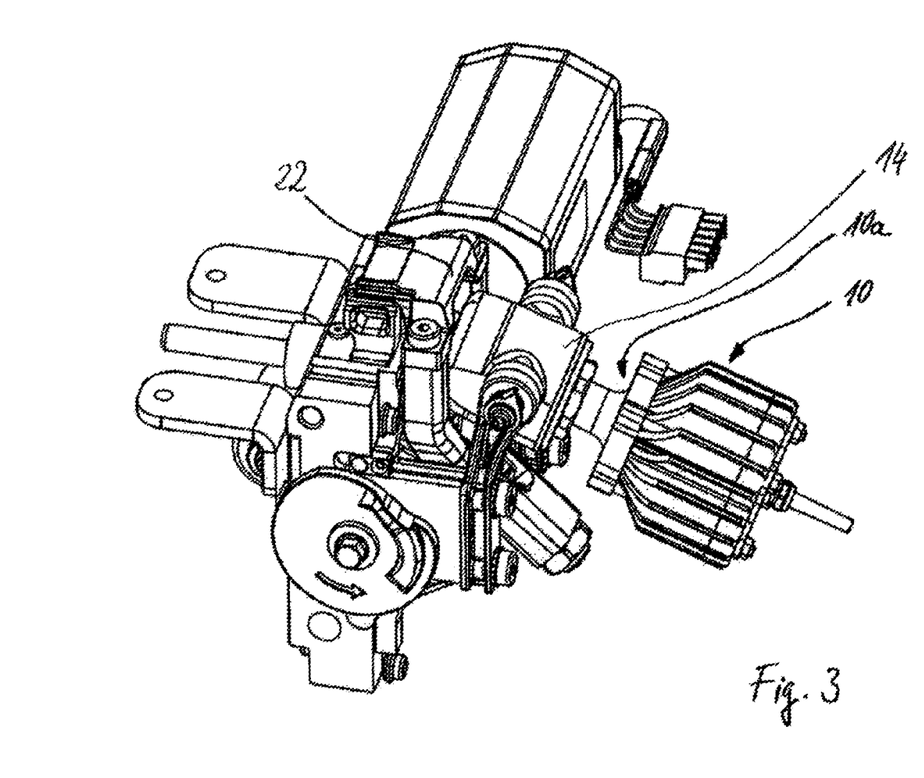
FIG. 3 shows a sonotrode device according to the invention fitted into an assembly of the strapping apparatus in a perspective illustration with an ultrasound converter and a sonotrode attached thereto.
Figure 7:
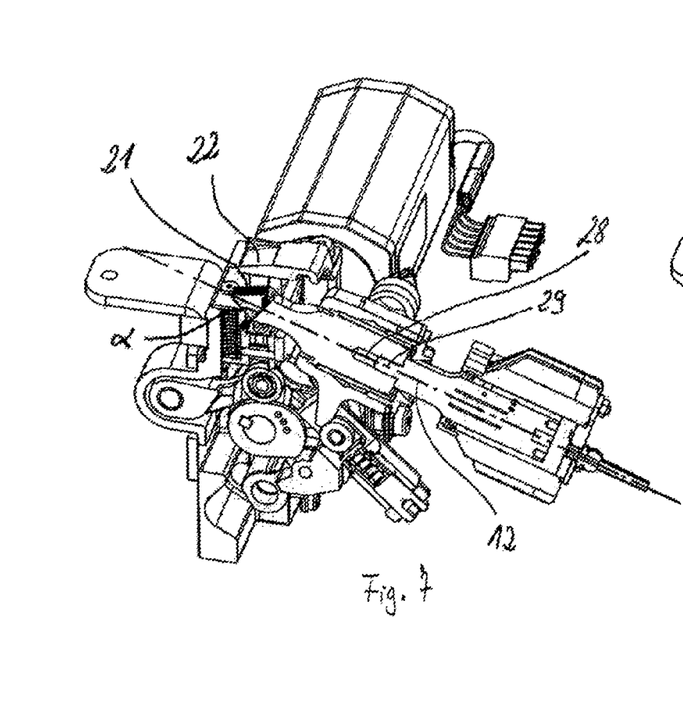
FIG. 7 shows the assembly with the sonotrode device in an open position which it takes up when not in use.
Figure 8:
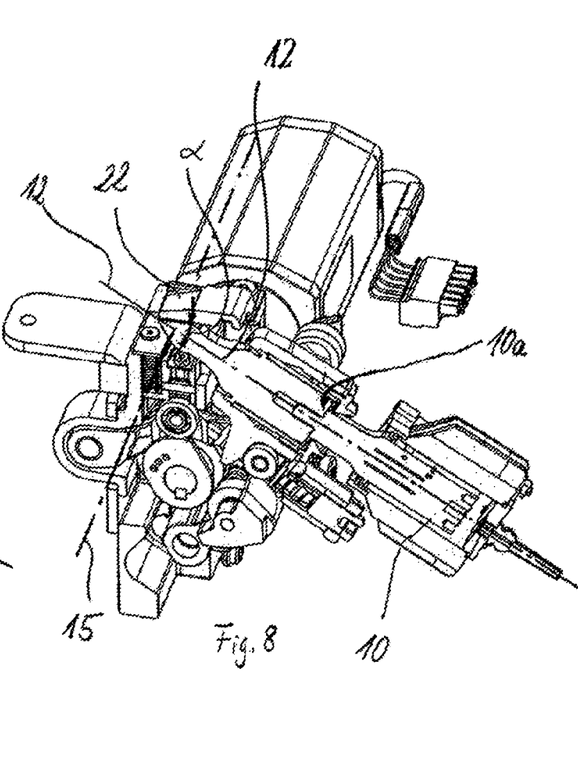
FIG. 8 shows the sonotrode device from FIG. 7 in a closed position which it takes up during use for forming a closure.

As can be gathered in particular from FIGS. 3, 7 and 8, the sonotrode device 13 which is provided with the sonotrode 11 and the ultrasound converter 10 is arranged on a holder 14 which holds the ultrasound converter 10, the sonotrode device 13 and in particular the sonotrode 11 thereof in one or more defined positions, in particular a predefined position, with respect to the band course which is provided for the strapping band in the region of the sonotrode device. The sonotrode 11 and the longitudinal axis 12, which is defined by the vibration direction, of the sonotrode device 13 are inclined, at least in a use position of the sonotrode, in relation to the band surface opposite the sonotrode, i.e. in an orientation differing from an orthogonal and from a parallel arrangement. In the preferred exemplary embodiment illustrated, the longitudinal axis 12 of the sonotrode 11 is located firstly in a plane which is oriented perpendicularly to the band longitudinal axis 15. Secondly, the longitudinal axis 12 is located outside a plane formed by the surface, which is close to the sonotrode, of the band, which is arranged in two layers at this point. The longitudinal axis 12 of the sonotrode 11 is therefore located in a plane oriented perpendicularly to the band longitudinal axis 15 and encloses an angle α with the plane of the band surface. In other embodiments, the longitudinal axis 12 of the sonotrode can also be arranged outside the plane oriented perpendicularly to the band surface. In such embodiments according to the invention, the longitudinal axis 12 also has an inclination in relation to the plane which is perpendicular to the band surface. In the exemplary embodiment, the angle α is approx. 30°. It is preferably selected from a range of 10° to 80°.

For contact against the band surface close to the sonotrode, in certain embodiments the sonotrode 11 can be provided with a first level contact surface 21 which can have a knurling or toothing in order to ensure a slip-proof contact pressure of the contact surface 21 with the or against the band surface. The knurling or toothing can be provided independently of the geometrical shape of the respective contact surface. On account of the previously discussed inclination of the longitudinal axis 12 of the sonotrode device, the contact surface 21 of the sonotrode also encloses an angle α with the longitudinal axis 12 of the sonotrode device 13. The contact surface 21 can have a substantially level surface at least in sections, which is provided during the formation of the closure for abutting in a flat, and therefore an at least substantially parallel manner, against a portion of the surface of the layer of the strapping band close to the sonotrode. If the respective contact surface 21 also has portions other than planar portions, in conjunction with the present invention the planar portion of the contact surface can preferably be used for defining the angle α enclosed with the longitudinal axis 12.

Figure 10:
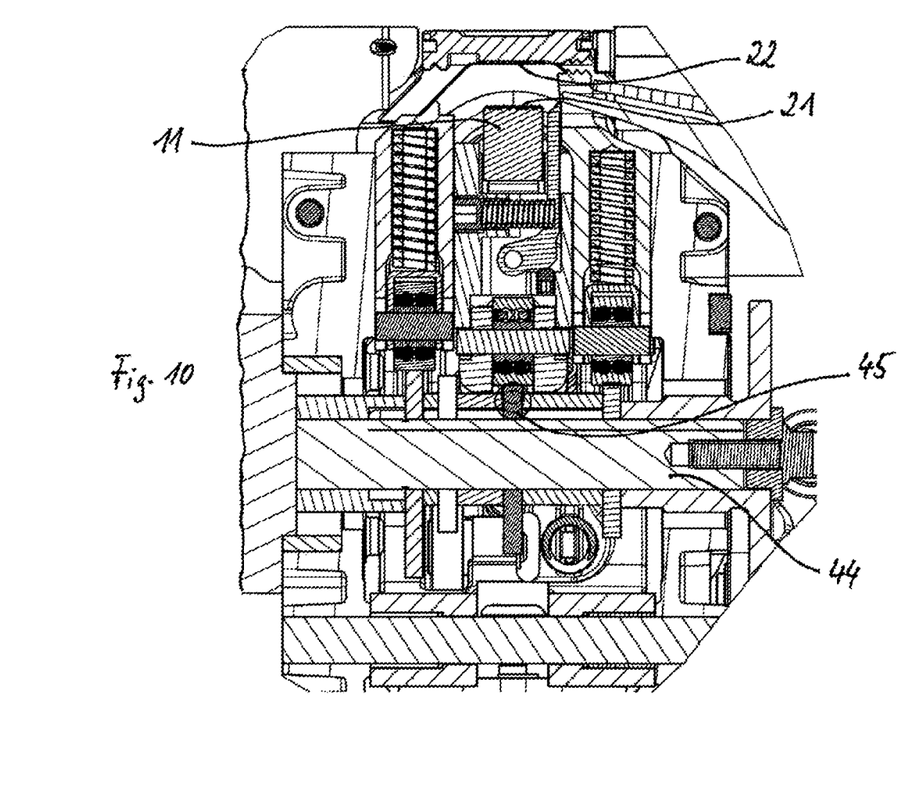
FIG. 10 shows a sectional illustration through the closure device along a control shaft.

The sonotrode 11 can be supplied here in particular by a driven movement to the band 16 and pressed against the latter such that firstly the contact surface 21 lies against the outer surface 17a of the band layer 17 close to the sonotrode. Secondly, the two inner surfaces 17b, 18b of the two band layers 17, 18 arranged one above the other therefore also lie against each other, and the sonotrode-remote band layer lies with its outer surface against a counterholder 22 of the sonotrode device. With said driven movement, a transfer of the sonotrode can therefore lead from a predetermined non-use position to a likewise predetermined use position of the sonotrode 11. By means of a likewise driven movement in the reverse direction, after the end of the use of the sonotrode for forming the closure, said sonotrode can be vice versa reset again from the use position into its non-use position. As can be seen in FIG. 10, the driven movements of the sonotrode 11 can be produced by means of a motor-driven control shaft 44 with which movements of other components of the strapping apparatus are also produced in the exemplary embodiment. A control disk 45 is arranged on the control shaft 44 and is in contact with a cam of the sonotrode device and, on the basis of the contour of the control disk 45, moves the sonotrode device.

Figures 4, 5, 6:
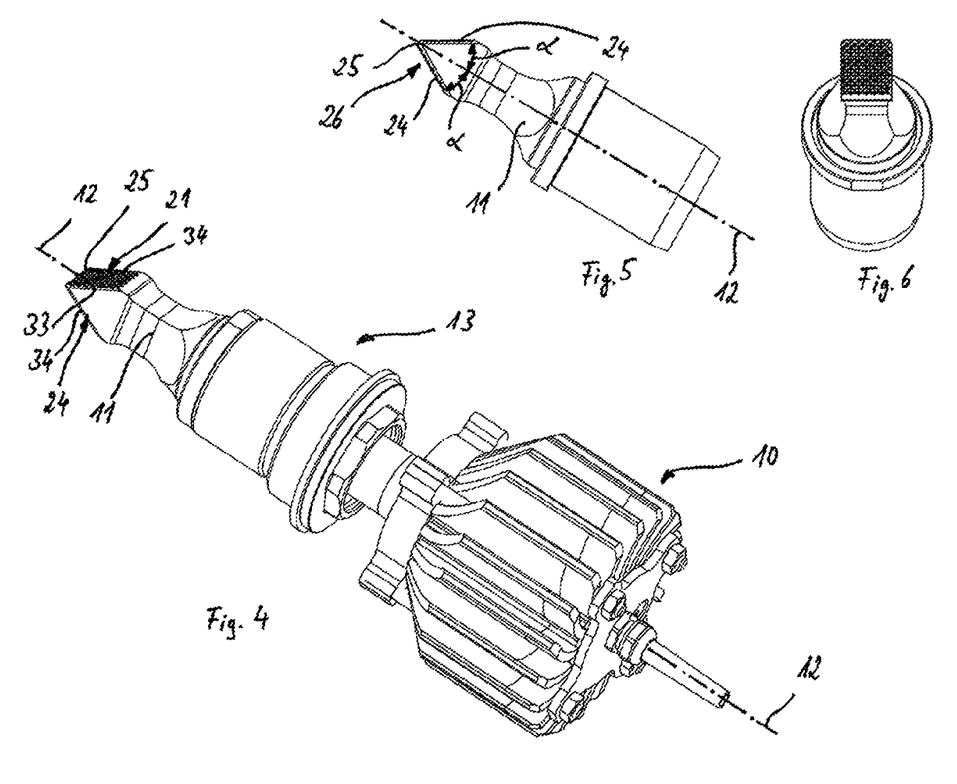
FIG. 4 shows a separate illustration of the sonotrode device from FIG. 3.
FIG. 5 shows the sonotrode of the sonotrode device from FIG. 4 in a side view.
FIG. 6 shows the sonotrode from FIG. 4 in a front view.

In the region of the free end of the sonotrode 11 which is illustrated in FIG. 4, is the releasable part of the sonotrode device and, in the illustration of FIG. 8, is shown in a use position, apart from the previously described first contact surface 21 a second contact surface 24 is also formed. In principle, it is not absolutely necessary for the second or further contact surfaces 24 to coincide with respect to their geometrical shape and size with the first contact surface. However, in the exemplary embodiment of the figures, the second contact surface 24 is identical with regard to its size, the geometrical shape and the knurling which is present to the first contact surface 21. In addition, the second contact surface 24 is arranged in a mirror-inverted manner with respect to the longitudinal axis 12 of the sonotrode 11. By this means, identical use conditions arise during the respective use of the two contact surfaces 21, 24 of the same sonotrode. One of the contact surfaces 21 is therefore arranged on the one side of the longitudinal axis 12 and the other of the contact surfaces 24 is arranged on the other side of the longitudinal axis 12. The two contact surfaces 21, 24 which are inclined at the same angle α in relation to the longitudinal axis 12 run together in a common longitudinal edge 25. The free end 26 of the sonotrode therefore has a conical shape or a wedge shape in the region of the two contact surfaces 21, 24.

The sonotrode 11 is held and mounted on the ultrasound converter 10 in an exchangeable and fastenable manner, for example by means of a screw connection between the sonotrode 11 and the converter 10. The mounting is provided in such a manner that the sonotrode 11 can be fastened releasably in two positions which are rotated by 180° with respect to the longitudinal axis 12 of the sonotrode device 13 and with respect to the holder 14. By this means, each of the two contact surfaces 21, 24 can be brought into, and arranged in, their use position in which the respective contact surface 21, 24 is provided for producing a closure and is used during each formation of strapping. As soon as the first contact surface 21 which is located in the use position on the sonotrode device is intended to be exchanged, in particular due to advanced wear of the first contact surface 21, the sonotrode 11 can be arranged in a position, which is rotated by 180° about the longitudinal axis, with respect to the previous position and orientation and with respect to the holder 14. In said relative position of the sonotrode 11 with respect to the holder 14, the second contact surface 24 is then in the same use position as contact surface 21 previously and can now be used instead of the first contact surface 21 for producing ultrasound-welded closures between the band layers. Only one of the two contact surfaces 21, 24 is therefore in each case located on the sonotrode device in the use position, wherein the use positions of the two contact surfaces 21, 24 are identical.

As is illustrated in the longitudinal sectional illustration of FIGS. 7 and 8, the sonotrode 11 has, in the region of its end side opposite the ultrasound converter 10, a blind hole-like recess 28 which is arranged symmetrically with respect to the sonotrode longitudinal axis 12. The ultrasound converter 10 can be provided on its end side 10a opposite the sonotrode 11 with a pin 29, the cross section of which is congruent to recess 28 of the sonotrode in such a manner that the pin 29 can be accommodated in a precisely fitting and play-free manner in the recess 28. A releasable connection between the sonotrode 11 and the ultrasound converter 10 can be achieved, for example, by the already mentioned threaded connection between said two elements. Other types of connection are also possible.

In an alternative embodiment to the threaded connection between the sonotrode 11 and the ultrasound converter 10, the cross-sectional shapes of the recess 28 and of the pin 29 can be selected here in such a manner that the pin 29 can only be arranged in the two positions offset by 180° with respect to each other in the recess 28. By means of a bayonet-like closure (not illustrated specifically), the sonotrode 11 and the ultrasound converter 10 can be fastened releasably to each other by the sonotrode 11 and the ultrasound converter 10 being fixed in a form-fitting manner on each other in particular in the direction of the longitudinal axis 12. In the two relative positions, the ultrasound and the vibration thereof is therefore transmitted in the same manner from the ultrasound converter to the sonotrode and, in the latter, to the respective contact surface 21, 24.

Figure 9:
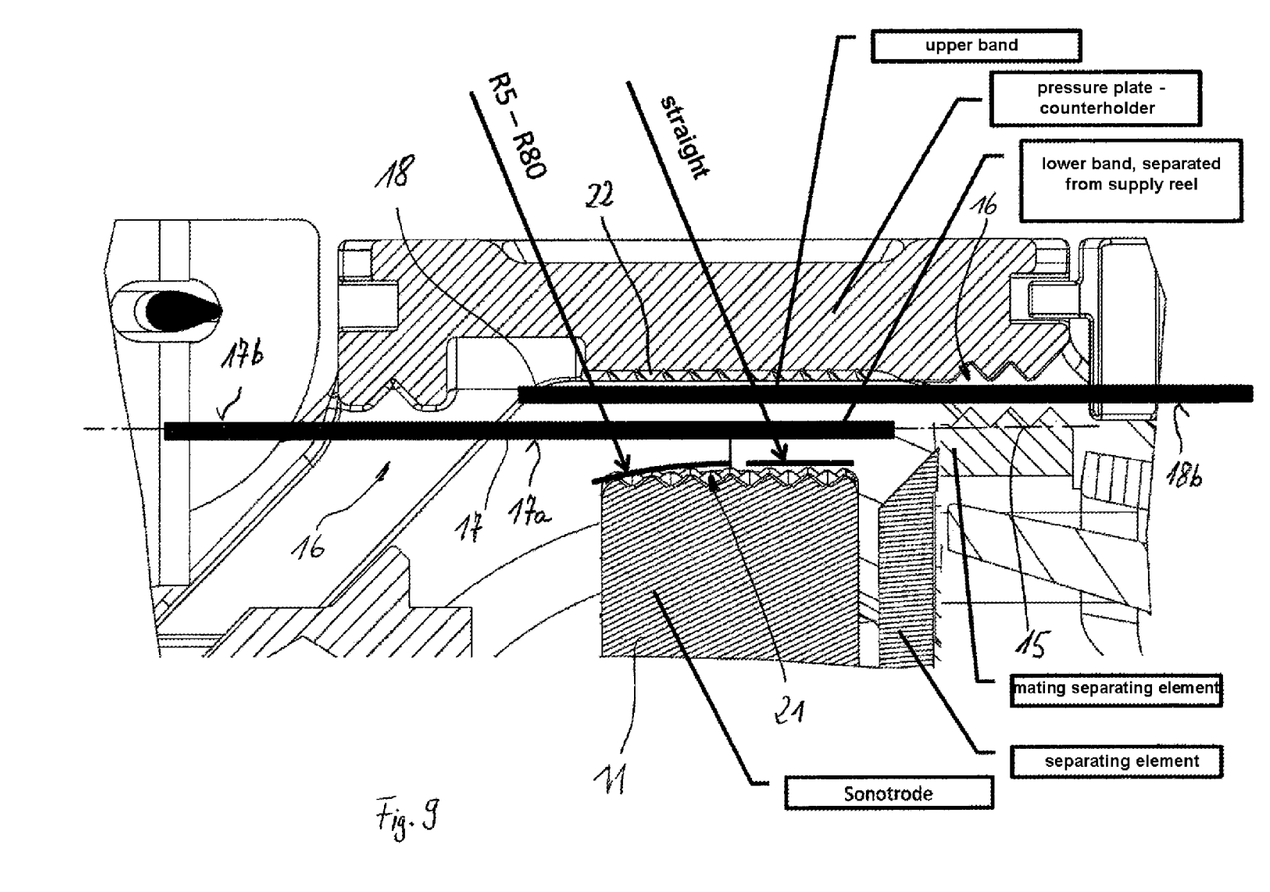
FIG. 9 shows a partial illustration of a longitudinal section through the closure device with the sonotrode.

At least one, preferably each, of the contact surfaces 21, 24 can be provided in the band running direction with a curvature 32, as is shown in FIG. 9. The curvature 32 can be provided in particular in such a manner that, as seen in the band running direction, at at least one of the outer sides or at longitudinal edges 33, 34 of the contact surface 21, 24 that are oriented transversely with respect to the band running direction, the distance of the contact surface 21, 24, which is located in the use position, from the strapping band is greater than along or in the region of the center of the contact surface. The curvature 32 preferably runs—as seen in the band running or band longitudinal direction—over the entire cross section of the respective contact surface 21, 24, wherein the contact surface 21, 24 has the smallest distance from a mating surface of the counterholder 22 at least approximately in the region of the center, between the front and rear longitudinal edge 33, 34 of the respective contact surface 21, 24, as seen in the band running direction.

In the illustrated preferred exemplary embodiment of FIG. 9, the curvature can extend over an angular range of 4° to 20°. The curvature which can have, for example, a radius from a range of 5 mm to 80 mm, preferably merges continuously into a flat portion of the respective contact surface 21, 24. This transition—as seen with respect to a direction parallel to the band running direction—can lie, for example, approximately in the center of the length of the contact surface 21, 24. The flat portion of the contact surfaces 21, 24 here can lie opposite the end region of the band of the band layer against which the contact surface 21, 24 lies during production of a closure. The portion of the contact surface 21, 24 which is provided with the curvature can preferably be arranged upstream of the flat portion of the contact surface, as seen in the direction of the band end of the directly opposite band portion.

By this means, during the use for the formation of a closure, at least one of the longitudinal edges 33, 34 is at the greatest distance from a mating surface of the counterholder 22. By means of this arrangement, at least one of the end-side longitudinal edges 33, 34 mentioned is also at a distance from the surface of the band during the formation of the closure while butting at a designated pressure against the strapping band, while at least one other region of the contact surface 21, 24, preferably at least one central region of the contact surface 21, 24 and/or a flat surface region of the contact surface 21, 24 adjoining the curvature lies against the surface of the band and therefore has a distance of zero. By this means, the advantage can be obtained that a gentle transition between closure and band loop is achieved, said transition leading to a higher load-bearing capacity of the closure.

In other embodiments, the at least one contact surface 21, 24 can also have a different geometrical shape. The contact surface can have, for example, a different shape of curvature than a radius, for example an elliptical shape or a curvature which can be described by a different mathematical function or can be designed as a free surface shape. Similarly, the angular range over which the curvature or a portion of the curvature of the contact surface 21, 24 extends can assume any value which can be realized.

The strapping apparatus 1 also preferably has a separating device 37 which severs the band loop from a band roller of the supply device 3 in an automated manner. The separating device 37 can be fastened to the closure device 5 with a movable, in particular pivotable, holder 14. The holder 14, by means of the movements provided therefor, can transfer the contact surface 21, 24 arranged in each case in the use position on the sonotrode device into the closure formation position and into the inoperative position. A blade 38 or a different separating element can be arranged on the holder 14 and carries out said driven movements of the holder. In addition, the separating element can be acted upon with a further driven movement which the separating element carries out relative to the holder 14 of the sonotrode device and which is used as a separating movement. In order to manage with as small a number of components as possible, the same drive and the same control element as for the carrier of the sonotrode device can preferably be used. In the exemplary embodiment, this can be a central driving motor 40 and the same control disk 41 which is arranged on a control shaft 42 on which further control disks are located with which further components of the strapping apparatus are moved and the use times thereof are determined.

During the separating operation, the separating element interacts with a mating separating element which is preferably fixed, i.e. immovable, at least during the separating operation and is likewise preferably designed as a blade. The separating element and the mating separating element interact in the manner of scissors and cut the band at the end of a strapping operation close to the closure in a region between the closure and the band supply. By means of the driven movement of the separating element, despite the arrangement on the carrier of the sonotrode device and despite the joint control operation of the movement of the carrier, the time of the separating operation can thereby be varied relative to the time of reaching the closure position of the contact surface. This can take place, for example, by varying the length of the path of the separating element until the cutting operation occurs or by varying a possible transmission ratio of the movement transmitted to the separating element by the control roller. The separating element can be loaded by means of a spring element in order to produce a resetting force. The spring element can be tensioned by the driven movement of the separating element during the separating operation, wherein relaxation of the spring element after the separating operation has taken place can lead to a resetting movement of the separating element into its starting position on the carrier.

LIST OF REFERENCE SIGNS

1 Strapping apparatus
3 Supply device
5 Tensioning and closure device
6 Band guide
8 Framework
9 Ultrasonic welding device
10 Ultrasound converter
10a End side
11 Sonotrode
12 Longitudinal axis
13 Sonotrode device
14 Holder
15 Band longitudinal axis
16 Band
17 Band layer close to the sonotrode
17a Surface
17b Inner surface
18 Band layer
18b Inner surface
21 Contact surface
22 Counterholder
24 Second contact surface
25 Longitudinal edge
26 Free end
28 Recess
29 Pin
32 Curvature
33 Longitudinal edge
34 Longitudinal edge
37 Separating device
38 Blade
40 Motor
41 Control disk
42 Control shaft
44 Control shaft
45 Control disk
α Angle

The invention claimed is:

1. A strapping device comprising:
a tensioning roller rotatable to tension a strap around a load;
an ultrasonic welding device configured to ultrasonically weld two overlapping portions of the strap to one another, the ultrasonic welding device comprising:
an ultrasound converter arranged on a converter longitudinal axis and configured to generate and transmit ultrasonic vibrations; and
a sonotrode arranged on the converter longitudinal axis and configured to receive the ultrasonic vibrations from the ultrasound converter,
wherein the sonotrode comprises a contact surface comprising a textured planar portion and a textured curved portion, wherein the curved portion of the contact surface curves away from a strap longitudinal axis of the overlapping portions of the strap,
wherein the sonotrode is movable from a non-use position in which the contact surface does not contact the strap to a use position in which the contact surface contacts one of the overlapping portions of the strap and transmits the ultrasonic vibrations to that one of the overlapping portions of the strap, and
wherein the contact surface is oriented so the textured planar portion of the contact surface is oriented at an angle α with respect to the converter longitudinal axis, wherein the angle α is acute; and
a blade movable to cut the strap from a strap supply to form a tensioned loop of strap around the load.

2. The strapping device of claim 1, wherein the angle α is between 5 and 15 degrees.

3. The strapping device of claim 1, wherein the angle α is no greater than 80 degrees.

4. The strapping device of claim 3, wherein the angle α is at least 30 degrees.

5. The strapping device of claim 1, wherein the sonotrode comprises a second contact surface, and wherein the sonotrode is configured to be re-oriented such that, when the sonotrode is in the use position, the second contact surface contacts the one of the overlapping portions of the strap and the contact surface does not contact the strap.

6. The strapping device of claim 5, wherein the contact surface and the second contact surface are symmetrical about a plane that includes the converter longitudinal axis.

7. The strapping device of claim 1, wherein the textured planar and curved portions of the contact surface comprise one of: knurling and toothing.

8. The strapping device of claim 1, further comprising an actuator configured to: (1) move the sonotrode from the non-use position to the use position to enable the ultrasonic welding device to ultrasonically weld the two overlapping portions of the strap to one another, and (2) move the blade to cut the strap.

9. The strapping device of claim 8, further comprising a cam shaft, wherein the actuator is operably connected to the cam shaft to rotate the cam shaft to cause the sonotrode to move from the non-use position to the use position and to cause the blade to move to cut the strap.

10. The strapping device of claim 1, wherein the converter longitudinal axis is transverse to the strap longitudinal axis of the overlapping portions of the strap.

11. The strapping device of claim 1, wherein the converter longitudinal axis corresponds to a direction of propagation of the ultrasonic vibrations from the ultrasound converter to the sonotrode.

12. The strapping device of claim 1, wherein the sonotrode is movable in translation along the converter longitudinal axis from the non-use position to the use position.

13. A method for strapping a load, the method comprising:
tensioning a strap around a load;
moving a contact surface of a sonotrode arranged on a converter longitudinal axis into contact with one of two overlapping layers of the strap, wherein the contact surface comprises a textured planar portion and a textured curved portion, wherein the curved portion of the contact surface curves away from a strap longitudinal axis of the overlapping portions of the strap, wherein the textured planar portion of the contact surface is oriented at an angle α with respect to the converter longitudinal axis, wherein the angle α is acute;
activating an ultrasound converter arranged on the converter longitudinal axis to generate and transmit ultrasonic vibrations to the sonotrode, which transmits those ultrasonic vibrations to the overlapping layers of the strap via the contact surface to ultrasonically weld the overlapping layers of the strap together; and
cutting the strap from a strap supply to form a tensioned loop of strap around the load.

14. The method of claim 13, wherein the textured planar and curved portions of the contact surface comprise one of: knurling and toothing.

15. The method of claim 13, further comprising moving the sonotrode in from a non-use position to a use position to move the contact surface of the sonotrode into contact with the one of the two overlapping layers of the strap.

16. The method of claim 15, further comprising moving the sonotrode in translation along the converter longitudinal axis from the non-use position into the use position to move the contact surface of the sonotrode into contact with the one of the two overlapping layers of the strap.

17. The method of claim 16, wherein the contact surface extends between a first longitudinal edge of the textured planar portion and a second longitudinal edge of the textured curved portion, wherein the second longitudinal edge is not in contact with the strap when the sonotrode is in the use position.

* * * * *